(12) United States Patent
Kim

(10) Patent No.: US 10,271,397 B2
(45) Date of Patent: Apr. 23, 2019

(54) CONTROL CIRCUIT AND METHOD OF LED LIGHTING APPARATUS

(71) Applicant: SILICON WORKS CO., LTD., Daejeon (KR)

(72) Inventor: Yong Geun Kim, Suwon-si (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 15/546,331

(22) PCT Filed: Jan. 26, 2016

(86) PCT No.: PCT/KR2016/000795
§ 371 (c)(1),
(2) Date: Jul. 26, 2017

(87) PCT Pub. No.: WO2016/122182
PCT Pub. Date: Aug. 4, 2016

(65) Prior Publication Data
US 2018/0027624 A1 Jan. 25, 2018

(30) Foreign Application Priority Data
Jan. 30, 2015 (KR) .................. 10-2015-0015046

(51) Int. Cl.
*H05B 33/00* (2006.01)
*H05B 33/08* (2006.01)

(52) U.S. Cl.
CPC ....... *H05B 33/0851* (2013.01); *H05B 33/083* (2013.01); *H05B 33/0824* (2013.01)

(58) Field of Classification Search
CPC ............ H05B 33/0815; H05B 33/0845; H05B 33/083; H05B 33/0809; H05B 33/0824; H05B 33/0812; H05B 33/0851; H05B 33/089; H05B 33/0818; H05B 37/02; H05B 33/0803; H05B 33/0848; H05B 33/0857; H05B 33/08
See application file for complete search history.

(56) References Cited

U.S. PATENT DOCUMENTS

2011/0210678 A1* 9/2011 Grajcar .............. H05B 33/0809
315/192

FOREIGN PATENT DOCUMENTS

| JP | 2008-537459 | 9/2008 |
| JP | 2014-170747 | 9/2014 |
| KR | 10-2014-0020001 | 2/2014 |
| WO | 2013/157884 | 10/2013 |
| WO | 2014/189298 | 11/2014 |
| WO | 2014/209009 | 12/2014 |

OTHER PUBLICATIONS

International Search Report for International Application No. PCT/KR2016/000795, dated May 19, 2016.
Written Opinion with English Translation for International Application No. PCT/KR2016/000795, dated May 19, 2016.

* cited by examiner

*Primary Examiner* — Monica C King
(74) *Attorney, Agent, or Firm* — Kile Park Reed & Houtteman PLLC

(57) ABSTRACT

Disclosed is a control circuit of an LED lighting apparatus, capable of reducing total harmonic distortion (THD). The control circuit may include a THD reduction circuit configured to control a driving current on a current path corresponding to light emission of an LED group in response to a change of a rectified voltage.

8 Claims, 5 Drawing Sheets

CONTROL CIRCUIT AND METHOD OF LED LIGHTING APPARATUS

BACKGROUND

1. Technical Field

The present disclosure relates to an LED lighting apparatus, and more particularly, to a control circuit and method of an LED lighting apparatus, which is capable of reducing total harmonic distortion (hereafter, referred to as "THD").

2. Related Art

A lighting apparatus is designed to use a light source which exhibits high light emission efficiency using a small amount of energy, in order to reduce energy consumption. Representative examples of the light source used in the lighting apparatus may include an LED.

The LED is differentiated from other light sources in terms of various aspects such as energy consumption, lifetime, and light quality. Since the LED is driven by a current, the lighting apparatus using the LED as a light source needs many additional circuits for current driving.

In order to solve the above-described problem, an AC direct-type lighting apparatus has been developed. The AC direct-type lighting apparatus is configured to convert an AC voltage into a rectified voltage, and drive a current using the rectified voltage such that the LED emits light. The rectified voltage indicates a voltage obtained by full-wave rectifying an AC voltage. Since the AC direct-type lighting apparatus uses the rectified voltage without using an inductor and capacitor, the AC direct-type lighting apparatus has a satisfactory power factor.

The AC direct-type lighting apparatus using an LED includes a driver configured to perform current regulation to provide a current path in response to light emission following a change of the rectified voltage.

The driver of the AC direct-type lighting apparatus may be configured to non-linearly control the current in response to the change of the rectified voltage through the current regulation for providing the current path corresponding to the light emission.

The AC direct-type lighting apparatus has high THD due to the non-linear control for the current. Therefore, the lighting apparatus is required to improve power efficiency by reducing THD.

SUMMARY

Various embodiments are directed to a control circuit and method of an LED lighting apparatus, which is capable of reducing THD by reducing a non-linear change of a current in response to turn-on/off of LEDs.

In an embodiment, there is provided a control circuit of an LED lighting apparatus which includes one or more LED groups to emit light in response to a change of a rectified voltage. The control circuit may include: a driver configured to provide a current path for a driving current of the one or more LED groups by compare a sensing voltage to one or more reference voltages corresponding to the one or more LED groups; and a THD reduction circuit configured to control the driving current to follow at least part of the change of the rectified voltage, the driving current being outputted from the driver.

In an embodiment, a control method of an LED lighting apparatus may include: sequentially emitting light one or more LED groups to in response to a change of a rectified voltage; providing, by a driver, a current path by comparing a sensing voltage to one or more reference voltages corresponding to the one or more LED groups in response to a sequential light emitting states of the one or more LED groups; primarily controlling, by the driver, a driving current on the current path in response to the change of the rectified voltage while the current path is provided; and secondarily controlling, by a THD reduction circuit, the driving current outputted from the driver such that the driving current follows at least part of the change of the rectified voltage. The driving current may be controlled to have a waveform following at least part of the change of the rectified voltage through the primary and secondary controls.

According to the embodiments of the present invention, the control circuit and method can reduce the non-linear change of the current which is changed in response to the turn-on/off of the LED groups. Therefore, the THD of a lighting apparatus including LEDs can be reduced.

DETAILED DESCRIPTION

Figure 1:
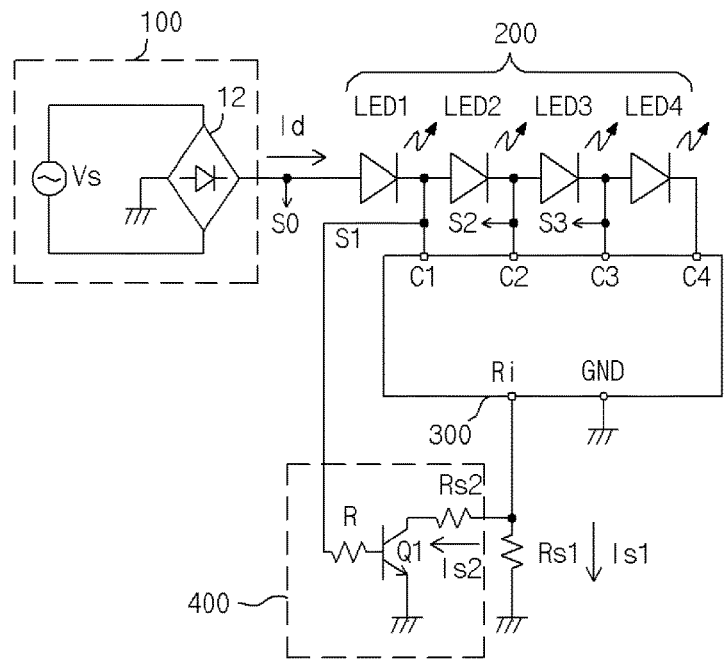
FIG. 1 is a circuit diagram illustrating a control circuit of an LED lighting apparatus according to an embodiment of the present invention.

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

A lighting apparatus according to an embodiment of the present invention may include a light source having a semiconductor light emission characteristic to convert electrical energy into light energy, and the light source having a semiconductor light emission characteristic may include an LED.

The lighting apparatus of FIG. 1 may include an AC-direct type lighting apparatus, emit light through a lighting unit including LEDs using an AC voltage, and perform current regulation in response to the light emission of the lighting unit.

The lighting apparatus includes a power supply unit 100, a lighting unit 200, a driver 300, a sensing resistor Rs1 and a THD reduction circuit 400.

The power supply unit 100 rectifies an AC voltage introduced from outside, and outputs the rectified voltage. The power supply unit 100 may include an AC power supply VAC having an AC voltage and a rectifier circuit 12 for rectifying the AC voltage and outputting the rectified voltage.

The AC power supply VAC may include a commercial power supply.

The rectifier circuit 12 full-wave rectifies an AC voltage having a sine wave from the AC power supply VAC, and outputs the rectified voltage. The rectified voltage has a ripple of which the voltage level rises/falls in a half cycle of the AC voltage. In the present embodiment, a rise or fall of the rectified voltage may be understood as the rise or fall of the ripple of the rectified voltage.

The lighting unit 200 may include LEDs which are divided into a plurality of LED groups. The lighting unit 200 sequentially turns on/off the plurality of LED groups according to the increase/decrease of the rectified voltage provided from the power supply unit 100.

FIG. 1 illustrates that the lighting unit 200 includes four LED groups LED1 to LED4. Each of the LED groups LED1 to LED4 may include one or more LEDs, and represented by one symbol for convenience of description.

The driver 300 provides a current path for the LED groups LED1 to LED4 by comparing a sensing voltage to reference voltages corresponding to the respective LED groups LED1 to LED4, and.

The driver 300 has terminals C1 to C4 connected to output terminals of the LED groups LED1 to LED4, respectively, a terminal GND for connection to the ground, and a terminal Ri connected to the sensing resistor Rs1. The driver 300 controls a change of current paths between the terminals C1 to C4 and the terminal Ri, and outputs a driving current corresponding to light emission of the LED groups LED1 to LED4. The driving current outputted from the driver 300 is equal to a current Id provided from the lighting unit 200. Therefore, the driving current is represented by Id.

The sensing resistor Rs1 is installed between the terminal Ri of the driver 300 and the ground, and provides sensing voltages corresponding to the light emission states of the LED groups LED1 to LED4.

The THD reduction circuit 400 is connected to the sensing resistor Rs1, and controls the driving current to follow at least part of a change of the rectified voltage. The THD reduction circuit 400 may include an additional sensing resistor Rs2, and change the sensing voltage in proportional to the change of the rectified voltage by controlling a current flowing through the sensing resistor Rs2.

The THD reduction circuit 400 includes the sensing resistor Rs2 and a current control element. The sensing resistor Rs2 is connected in parallel to the sensing resistor Rs1, and positioned between the terminal Ri of the driver 300 and the current control element. The current control element may control the current flowing through the sensing resistor Rs2 according to a control voltage S1 following at least part of the change of the rectified voltage, and include an NPN transistor Q1 having a base configured to receive the control voltage S1. The control voltage S1 may be transferred through a resistor R. More specifically, the NPN transistor Q1 has a collector connected to the sensing resistor Rs2, an emitter connected to the ground, and the base configured to receive the control voltage S1.

In the present embodiment, any one of a rectified voltage SO outputted from the rectifier circuit 12 and output voltages S1 to S3 of the LED groups LED1 to LED3 excluding the LED group LED4 that finally emits light may be used as the control voltage. The present embodiments are based on the supposition that the output voltage of the LED group LED1 is used as the control voltage S1.

The driver 300 provides a current path corresponding to light emissions of the LED groups LED1 to LED4, and performs current regulation to regulate a flow of the driving current ID of the current path.

The LED groups LED1 to LED4 of the lighting unit 200 are sequentially turned on or off in response to the changes of the rectified voltage.

When the rectified voltage sequentially reaches the light emission voltages of the LED groups LED1 to LED4, the driver 300 provides a current path corresponding to light emissions of the respective LED groups LED1 to LED4.

The light emission voltage V4 for controlling the LED group LED4 to emit light is defined as a voltage for controlling all of the LED groups LED1 to LED4 to emit light. The light emission voltage V3 for controlling the LED group LED3 to emit light is defined as a voltage for controlling all of the LED groups LED1 to LED3 to emit light. The light emission voltage V2 for controlling the LED group LED2 to emit light is defined as a voltage for controlling all of the LED groups LED1 and LED2 to emit light. The light emission voltage V1 for controlling the LED group LED1 to emit light is defined as a voltage for controlling only the LED group LED1 to emit light.

The driver 300 receives a sensing voltage that corresponds to the light emitting states of the LED groups LED1 to LED4, and is changed to follow at least part of the change of the rectified voltage through the control of the driving current Id by the THD reduction circuit 400.

Figure 2:
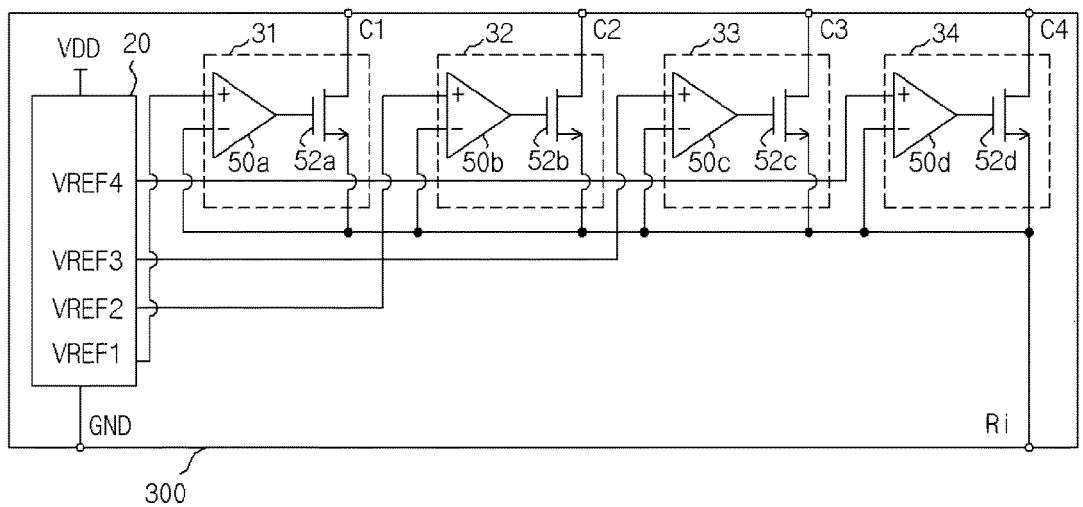
FIG. 2 is a detailed circuit diagram of a driver of FIG. 1.

As illustrated in FIG. 2, the driver 300 includes switching circuits 31 to 34 for providing a current path to the LED groups LED1 to LED4 and a reference voltage supply unit 20 for supplying the reference voltages VREF1 to VREF4.

The reference voltage supply unit 20 may be configured to provide the reference voltages VREF1 to VREF4 having different levels, according to a designer's intention.

The reference voltage supply unit 20 may include a plurality of resistors connected in series to receive a constant voltage VDD, and output the reference voltage VREF1 to VREF4 having different levels to nodes between the respective resistors. The plurality of resistors are connected to the ground GND. In another embodiment, the reference voltage supply unit 20 may include independent voltage supply sources for providing the reference voltages VREF1 to VREF4 having different levels, respectively.

Among the reference voltages VREF1 to VREF4 having different levels, the reference voltage VREF1 may have the lowest voltage level, and the reference voltage VREF4 may have the highest voltage. The voltage levels of the reference voltages VREF1 to VREF4 may have a relation of VREF1>VREF2>VREF3>VREF4.

The reference voltage VREF1 has a level for turning off the switching circuit 31 at a point of time that the LED group LED2 emits light. More specifically, the reference voltage VREF1 may be set to a lower level than a sensing voltage formed in response to the light emission of the LED group LED2.

The reference voltage VREF2 has a level for turning off the switching circuit 32 at a point of time that the LED group LED3 emits light. More specifically, the reference voltage VREF2 may be set to a lower level than a sensing voltage formed in response to the light emission of the LED group LED3.

The reference voltage VREF3 has a level for turning off the switching circuit 33 at a point of time that the LED group LED4 emits light. More specifically, the reference voltage VREF3 may be set to a lower level than a sensing voltage formed in response to the light emission of the LED group LED4.

The reference voltage VREF4 may be set to a higher level than the sensing voltage in the upper limit level region of the rectified voltage.

The switching circuits 31 to 34 are connected to the sensing resistor Rs in common, in order to perform current regulation and form a current path.

The switching circuits 31 to 34 compare the sensing voltage to the reference voltages VREF1 to VREF4 of the reference voltage supply unit 20, and form a current path corresponding to light emission of the lighting unit 200.

Each of the switching circuits 31 to 34 receives a high-level reference voltage as the switching circuit is connected to an LED group remote from the position to which the rectified voltage is applied.

The switching circuits 31 to 34 may include comparators 50a to 50d and switching elements, respectively, and the switching elements may be implemented with NMOS transistors 52a to 52d, respectively.

Each of the comparators 50a to 50d of the switching circuits 31 to 34 has a positive input terminal (+) configured to receive a reference voltage, a negative input terminal (−) configured to receive a sensing voltage, and an output terminal configured to output a comparison result between the reference voltage and the sensing voltage.

The NMOS transistors 52a to 52d of the respective switching circuits 31 to 34 perform a switching operation according to the outputs of the respective comparators 50a to 50d, which are applied to the gates thereof.

In the embodiment of FIG. 1, the THD reduction circuit 400 includes the sensing resistor Rs2 connected to the sensing resistor Rs1, and controls the driving current to follow at least part of the change of the rectified voltage.

More specifically, the THD reduction circuit 400 uses the control voltage S1 as a voltage following at least part of the change of the rectified voltage, and the NPN transistor Q1 controls the current amount of the sensing resistor Rs2 in response to a change of the control voltage S1.

The control voltage S1 follows a change of the rectified voltage having a higher level than the light emission voltage V1 that turns on the LED group LED1. Therefore, the control voltage S1 increases/decreases in proportion to the change of the rectified voltage, after the LED group LED1 is turned on.

Figure 3:
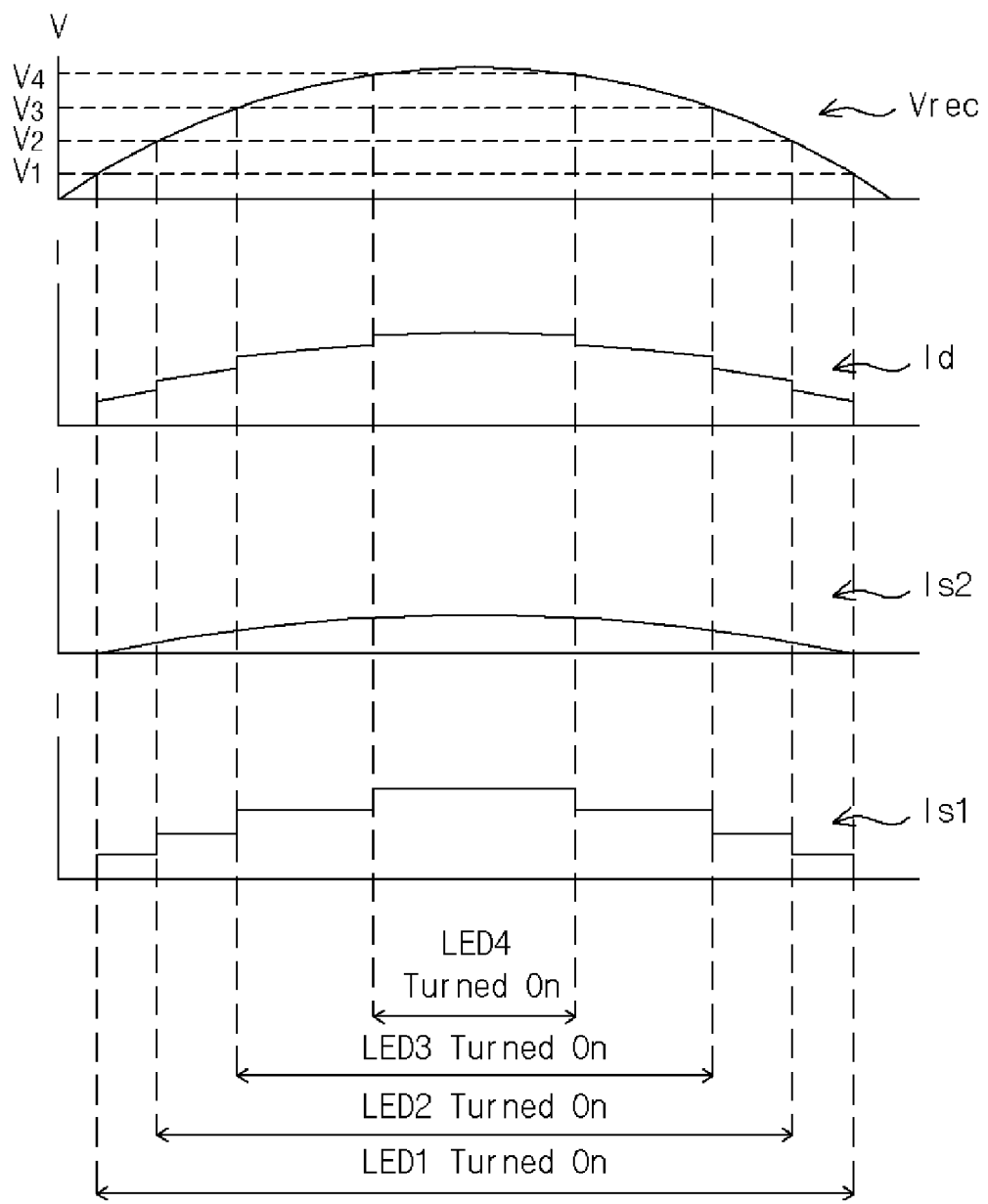
FIG. 3 is a waveform diagram for describing an operation of the embodiment of FIG. 1.

The NPN transistor Q1 may perform current control according to the control voltage S1, and the current of the sensing resistor Rs2 may be expressed as indicated by the current Is2 of FIG. 3. The current Is2 flowing through the sensing resistor Rs2 may be changed in response to the whole section in which the control voltage S1 is changed, and the NPN transistor Q1 may be designed to have a capacity capable of controlling a current in response to the change of the control voltage S1.

The current control using the above-described NPN transistor Q1 induces a change in resistance value of the THD reduction circuit 400. That is, the resistance value of the THD reduction circuit 400 of FIG. 1 is decreased when the current amount of the NPN transistor Q1 is increased in response to a rise of the rectified voltage, and increased when the current amount of the NPN transistor Q1 is decreased in response to a fall of the rectified voltage.

That is, the THD reduction circuit 400 has a resistance value that is inversely proportional to the change of the rectified voltage.

Unlike the THD reduction circuit 400, the sensing resistor Rs1 has a fixed resistance value.

The sensing resistor Rs1 and the THD reduction circuit 400 are connected in parallel to the current path of the driver 300. Therefore, a resistance value acting on the current path of the driver 300 follows the change in resistance value of the THD reduction circuit 400. That is, the resistance value acting on the current path of the driver 300 increases in proportion to the decrease in resistance value of the THD reduction circuit 400, and decreases in proportion to the increase in resistance value of the THD reduction circuit 400.

In other words, the resistance value acting on the current path of the driver 300 is varied in inverse proportion to the change of the rectified voltage. Thus, the sensing voltage for regulating the current amount of the driving current Id in the current path of the driver 300 is also varied in inverse proportion to the change of the rectified voltage. Therefore, the current amount in the current path of the driver 300 is increased as much as the sensing voltage falls, and decreased as much as the sensing voltage rises.

For example, suppose that the rectified voltage is changed between the light emission voltage V1 of the LED group LED1 and the light emission voltage V2 of the LED group LED2. At this time, a switching path may be provided by the switching circuit 31 as described later.

In this case, when the rectified voltage gradually increases from the light emission voltage V1 toward the light emission voltage V2, a sensing voltage fed back to the switching circuit 31 of the driver 300 gradually falls, and the driving current Id of the current path formed by the switching circuit 31 gradually increases. At this time, the current Is1 of the sensing resistor Rs1 having a fixed resistance value maintains a constant amount. Therefore, the increase in amount of the driving current Id of the current path corresponds to the current Is2 flowing through the sensing resistor Rs2 of the THD reduction circuit 400.

On the other hand, when the rectified voltage gradually decreases from the light emission voltage V2 toward the light emission voltage V1, the sensing voltage fed back to the switching circuit 31 of the driver 300 gradually rises, and the driving current Id of the current path formed by the switching circuit 31 gradually decreases. At this time, the current Is1 of the sensing resistor Rs1 having the fixed resistance value maintains the constant amount. Therefore, the decrease of the driving current Id of the current path corresponds to the current Is2 flowing through the sensing resistor Rs2 of the THD reduction circuit 400.

In the present embodiment, the change of the driving current Id may be controlled to follow at least part of the change of the rectified voltage through the operation of the THD reduction circuit 400.

The operation of the present embodiment having the configuration of FIGS. 1 and 2 will be described in detail with reference to FIG. 3.

When the rectified voltage Vrec is in the initial state, all of the switching circuits 31 to 34 retain a turn-on state, because the reference voltages VREF1 to VREF4 applied to the positive input terminals (+) thereof are higher than the sensing voltage applied to the negative input terminals (−) thereof.

Then, when the rectified voltage Vrec rises to reach the light emission voltage V1, the LED group LED1 emits light. When the LED group LED1 emits light, the switching circuit 31 connected to the LED group LED1 provides a current path.

When the LED group LED1 emits light, the driving current Id starts to flow through the current path formed by the switching circuit 31. However, since the sensing voltage at this time has a low level, the turn-on states of the switching circuits 31 to 34 are not changed.

Then, while the rectified voltage Vrec reaches the light emission voltage V2, the driving current Id of the current path formed by the switching circuit 31 gradually increases according to the increase of the current Is2 through the operation of the THD reduction circuit 400.

Then, when the rectified voltage Vrec reaches the light emission voltage V2, the LED group LED2 emits light. When the LED group LED2 emits light, the switching circuit 32 connected to the LED group LED2 provides a current path. At this time, the LED group LED1 also maintains the light emitting state.

When the LED group LED2 emits light, the driving current Id starts to flow through the current path formed by the switching circuit 32, and the level of the sensing voltage is raised in response to the change of the rectified voltage Vrec by the sensing resistor Rs1. The level of the sensing voltage at this time is higher tan the reference voltage VREF1. Thus, the NMOS transistor 52 of the switching circuit 31 is turned off by an output of the comparator 50. That is, the switching circuit 31 is turned off, and the switching circuit 32 provides a selective current path corresponding to the light emission of the LED group LED2.

The amount of the driving current Id at the point of time that the switching circuit 32 starts to provide the current path non-linearly increases from the current amount of the current path formed by the switching circuit 31. At this time, the amount of the driving current Id has already increased in proportion to the increase of the rectified voltage Vrec while the rectified voltage Vrec rose to the light emission voltage V2. Therefore, the non-linear increase of the driving current Id by the change of the current path at the point of time that the LED group LED2 emits light can be considerably reduced, compared to when the operation of the THD reduction circuit 400 is excluded. Therefore, an occurrence of THD can be reduced as much as the non-linear increase of the driving current Id is reduced.

Then, while the rectified voltage Vrec reaches the light emission voltage V3, the driving current Id of the current path formed by the switching circuit 32 gradually increases according to the increase of the current Is2 through the operation of the THD reduction circuit 400.

When the rectified voltage Vrec reaches the light emission voltage V3, the LED group LED3 emits light. When the LED group LED3 emits light, the switching circuit 33 connected to the LED group LED3 provides a current path. At this time, the LED groups LED1 and LED2 also maintain the light emitting state.

When the LED group LED3 emits light, the driving current Id starts to flow through the current path formed by the switching circuit 33, and the level of the sensing voltage by the sensing resistor Rs1 rises in response to the change of the rectified voltage Vrec. The level of the sensing voltage at this time is higher tan the reference voltage VREF2. Thus, the NMOS transistor 52 of the switching circuit 32 is turned off by an output of the comparator 50. That is, the switching circuit 32 is turned off, and the switching circuit 33 provides a selective current path corresponding to the light emission of the LED group LED3.

The amount of the driving current Id at the point of time that the switching circuit 33 starts to provide the current path non-linearly increases from the current amount of the current path formed by the switching circuit 31. At this time, the amount of the driving current Id has already increased in proportion to the increase of the rectified voltage Vrec while the rectified voltage Vrec rose to the light emission voltage V3. Therefore, the non-linear increase of the driving current Id by the change of the current path at the point of time that the LED group LED3 emits light can be considerably reduced, compared to when the operation of the THD reduction circuit 400 is excluded. Therefore, an occurrence of THD can be reduced as much as the non-linear increase of the driving current Id is reduced.

Then, while the rectified voltage Vrec reaches the light emission voltage V4, the driving current Id of the current path formed by the switching circuit 33 gradually increases according to the increase of the current Is2 through the operation of the THD reduction circuit 400.

Then, when the rectified voltage Vrec reaches the light emission voltage V4, the LED group LED4 emits light. When the LED group LED4 emits light, the switching circuit 34 connected to the LED group LED4 provides a current path. At this time, the LED groups LED1 to LED3 also maintain the light emitting state.

When the LED group LED4 emits light, the driving current Id starts to flow through the current path formed by the switching circuit 34, and the level of the sensing voltage is raised in response to the change of the rectified voltage Vrec by the sensing resistor Rs1. The level of the sensing voltage at this time is higher tan the reference voltage VREF3. Thus, the NMOS transistor 52 of the switching circuit 33 is turned off by an output of the comparator 50. That is, the switching circuit 33 is turned off, and the switching circuit 34 provides a selective current path corresponding to the light emission of the LED group LED4.

At this time, the amount of the driving current Id at the point of time that the switching circuit 34 starts to provide the current path non-linearly increases from the current amount of the current path formed by the switching circuit 33. At this time, the amount of the driving current Id has already increased in proportion to the increase of the rectified voltage Vrec while the rectified voltage Vrec rose to the light emission voltage V4. Therefore, the non-linear increase of the driving current Id by the change of the current path at the point of time that the LED group LED4 emits light can be considerably reduced, compared to when the operation of the THD reduction circuit 400 is excluded. Therefore, an occurrence of THD can be reduced as much as the non-linear increase of the driving current Id is reduced.

Then, the rectified voltage Vrec starts to fall after reaching the upper limit level.

While the rectified voltage Vrec reaches the upper limit level, the driving current Id of the current path formed by the switching circuit 34 gradually increases according to the increase of the current Is2 through the operation of the THD reduction circuit 400.

On the other hand, while the rectified voltage Vrec falls to the light emission voltage V4 from the upper limit level, the driving current Id of the current path formed by the switching circuit 34 gradually decreases according to the decrease of the current Is2 through the operation of the THD reduction circuit 400.

Then, when the rectified voltage Vrec falls below the light emission voltage V4, the LED group LED4 is turned off. When the LED group LED4 is turned off, the light emission by the LED groups LED3 to LED1 is maintained, and a current path is formed by the switching circuit 33 connected to the LED group LED3.

At this time, the amount of the driving current Id at the point of time that the switching circuit 33 starts to provide the current path non-linearly decreases from the current amount of the current path formed by the switching circuit 34. However, the amount of the driving current Id has already decreased in proportion to the decrease of the rectified voltage Vrec while the rectified voltage fell to the light emission voltage V3. Thus, the non-linear increase of the driving current Id by the change of the current path at the point of time that the LED group LED4 is turned off can be considerably reduced, compared to when the operation of the THD reduction circuit 400 is excluded. Therefore, an occurrence of THD can be reduced as much as the non-linear decrease of the driving current Id is reduced.

Then, when the rectified voltage Vrec sequentially falls below the light emission voltages V3 to V1, the LED groups LED3 to LED1 are sequentially turned off.

The amount of the driving current Id in the current path formed by the switching circuits 32 and 31 at the points of time that the LED groups LED3 to LED1 are sequentially turned off non-linearly decreases. However, the amount of the driving current Id in the current path has already decreased in proportion to the decrease of the rectified voltage Vrec, while the rectified voltage fell. Thus, the non-linear decrease of the driving current Id by the change of the current path at the points of time that the LED groups LED3 and LED2 are turned off can be considerably reduced, compared to when the operation of the THD reduction circuit 400 is excluded. Therefore, an occurrence of THD can be reduced as much as the non-linear decrease of the driving current Id is reduced.

In the embodiment of FIG. 1, when the sensing resistor Rs1 is increased to infinity, the driving current Id may follow the current change of the THD reduction circuit 400. The case in which the sensing resistor Rs1 is increased to infinity in the embodiment of FIG. 1 may be configured as illustrated in FIG. 4.

Figure 4:
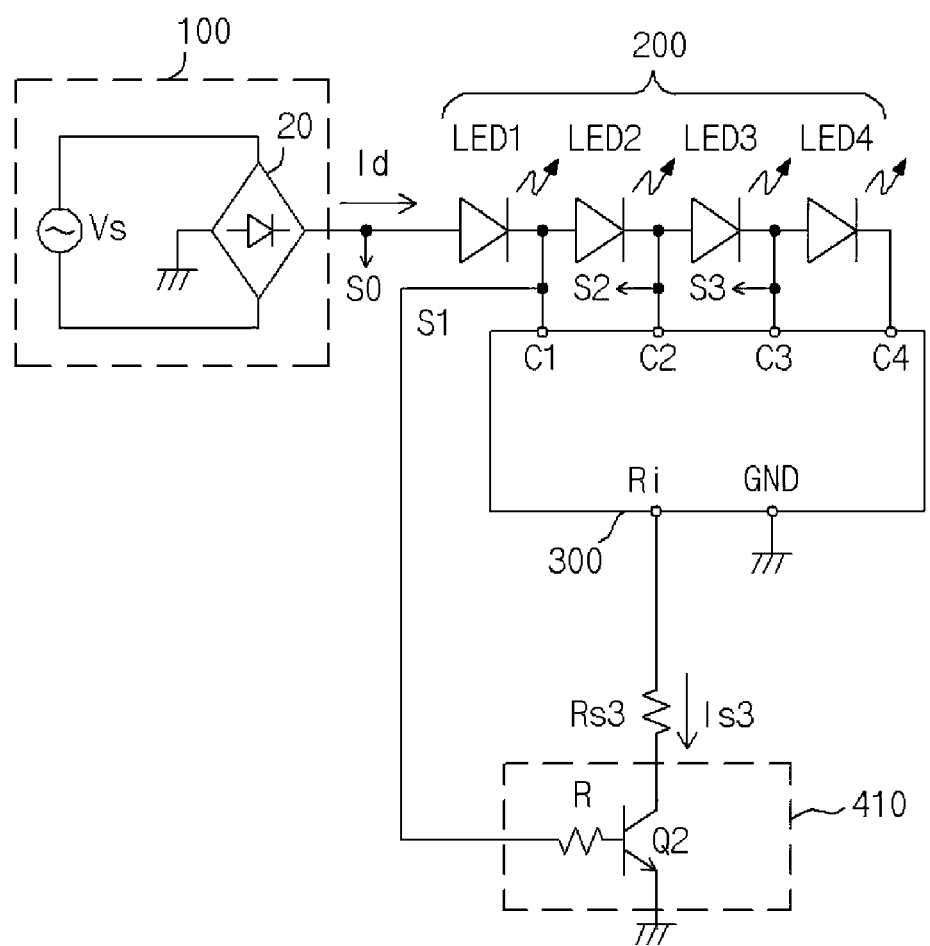
FIG. 4 is a circuit diagram illustrating a control circuit of an LED lighting apparatus according to another embodiment of the present invention.

FIG. 4 illustrates that the THD reduction circuit 410 is connected in series to the sensing resistor Rs3. In the embodiment of FIG. 4, an occurrence of THD can also be reduced by the change of the driving current Id through the operation of the THD reduction circuit 410. In the embodiment of FIG. 4, the power supply unit 100, the lighting unit 200, the driver 300 and the sensing resistor Rs3 are configured in the same manner as illustrated in FIG. 1. Thus, the duplicated descriptions thereof are omitted herein. The sensing resistor is represented by "Rs3" in order to distinguish the sensing resistor from the sensing resistor Rs2 of FIG. 1, and a current flowing through the sensing resistor Rs3 is represented by "Is3".

In the embodiment of FIG. 4, the THD reduction circuit 410 is connected in series to the sensing resistor Rs3, and configured to change the driving current Id to follow at least part of a change of the rectified voltage Vrec. More specifically, the THD reduction circuit 410 changes the amount of the driving current Id in proportion to the change of the rectified voltage Vrec.

For this operation, the THD reduction circuit 410 may include a current control element which is driven by a control voltage following at least part of the change of the rectified voltage Vrec, and controls a current flow between the sensing resistor Rs3 and the ground. The current control element may include an NPN transistor Q2. More specifically, the NPN transistor Q2 has a collector connected to the sensing resistor Rs3, an emitter connected to the ground, and a base configured to receive the control voltage S1.

In the embodiment of FIG. 4, any one of a rectified voltage S0 outputted from the rectifier circuit 12 and output voltages S1 to S3 of the LED groups LED1 to LED3 excluding the LED group LED4 that finally emits light may be used as the control voltage as in the embodiment of FIG. 1.

More specifically, the THD reduction circuit 410 uses the control voltage S1 as the voltage following at least part of the change of the rectified voltage Vrec, and the NPN transistor Q2 controls the current amount of the sensing resistor Rs3 in response to a change of the control voltage S1.

The NPN transistor Q2 operated by the control voltage S1 may control the amount of the current Is3 of the sensing resistor Rs3 to follow the change of the rectified voltage as illustrated in FIG. 4. The NPN transistor Q2 may be designed to have a capacity capable of controlling the current Is3 in response to the change of the control voltage S1.

Figure 5:
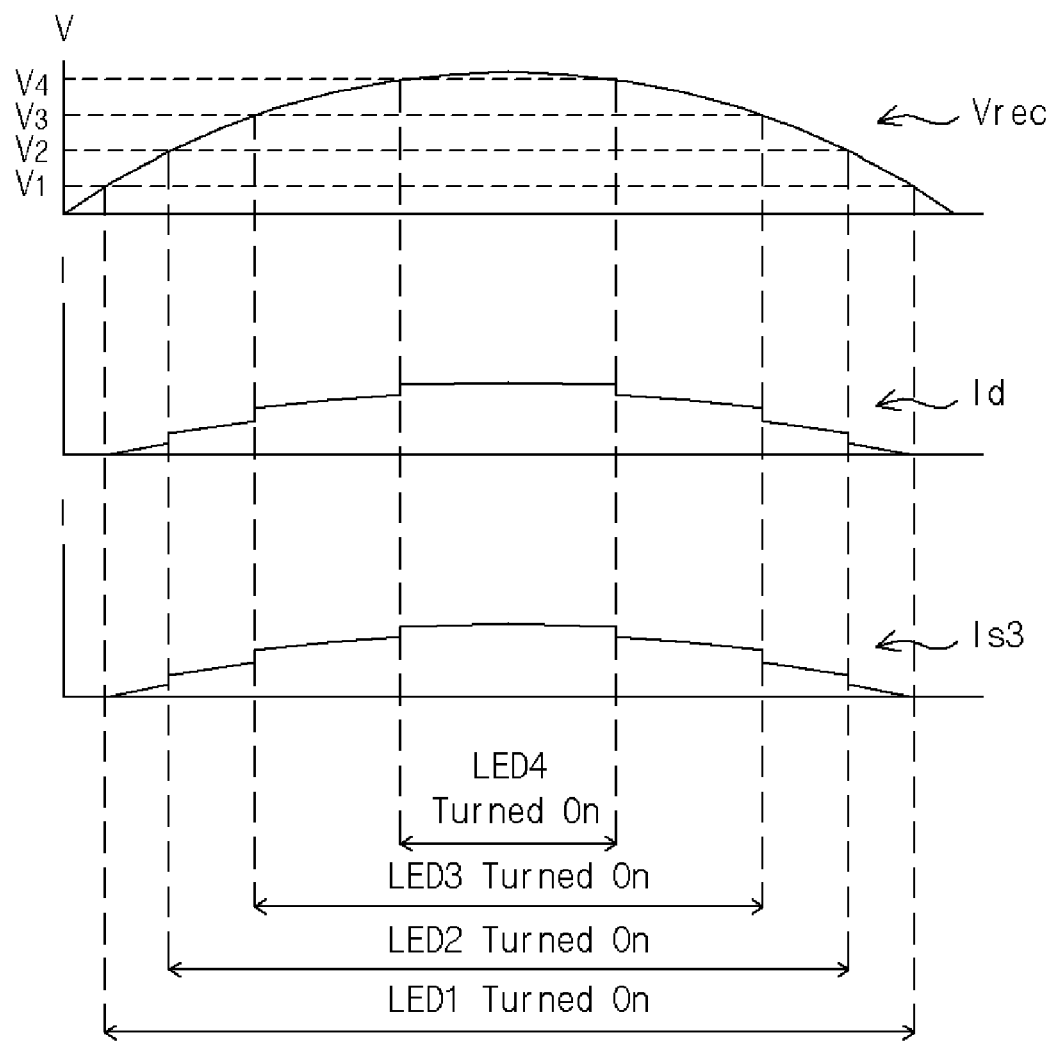
FIG. 5 is a waveform diagram for describing an operation of the embodiment of FIG. 4.

As described above, the THD reduction circuit 410 using the NPN transistor Q2 controls the current Is3 to follow the increase of the rectified voltage Vrec after the point of time that the LED group LED1 emits light as illustrated in FIG. 5. That is, the THD reduction circuit 410 increases the driving current Id of the current path to follow the increase of the rectified voltage Vrec after the point of time that the LED group LED1 emits. The driving current Id of the current path may be expressed as the same current as the current Is3 flowing through the sensing resistor Rs3. On the other hand, the THD reduction circuit 410 using the NPN transistor Q2 decreases the driving current Id of the current path to follow the fall of the rectified voltage Vrec.

Therefore, the non-linear change of the driving current Id by the change of the current path at the point of time that each of the LED groups is turned on or off in the embodiment of FIG. 4 can be considerably reduced, compared to when the operation of the THD reduction circuit 410 is excluded. Thus, an occurrence of THD can be reduced as much as the non-linear decrease of the driving current Id is reduced.

Figure 6:
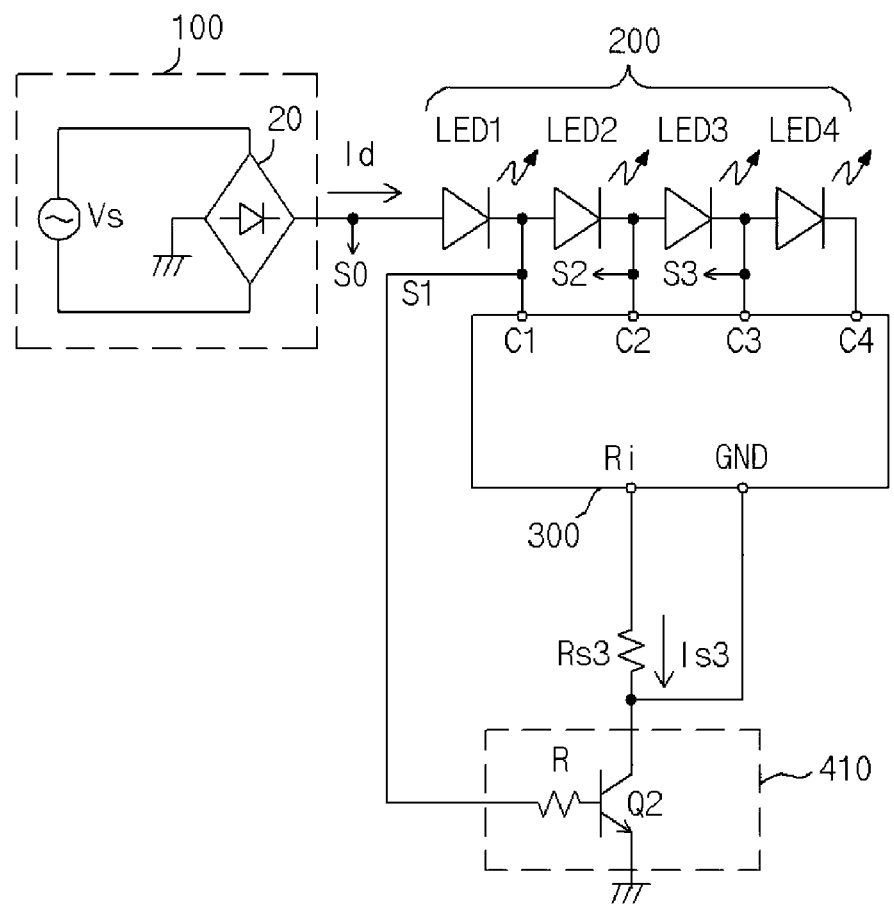
FIG. 6 is a circuit diagram illustrating a control circuit of an LED lighting apparatus according to still another embodiment of the present invention.

The present invention may be modified as illustrated in FIG. 6.

In the embodiment of FIG. 6, the power supply unit 100, the lighting unit 200, the driver 300, the sensing resistor Rs3 and the THD reduction circuit 410 are configured in the same manner as illustrated in FIG. 4. Thus, the duplicated descriptions thereof are omitted herein.

The embodiment of FIG. 6 is different from the embodiment of FIG. 4 in that the sensing resistor Rs3 forms a current path and is connected between the terminal Ri for providing a sensing voltage and the ground terminal GND of the driver 300.

As a result, the THD reduction circuit 410 may provide a path to the sensing resistor Rs3 and the driver 300, the path being connected to the ground, and change the driving current Id corresponding to light emission.

In the embodiment of FIG. 6, the sensing voltage provided to the driver 300 may be provided in the same manner as the THD reduction circuit 400 of FIG. 1 is excluded, because the sensing resistor Rs3 is coupled between the terminal Ri and the ground terminal GND.

Therefore, when the THD reduction circuit 410 is excluded in the embodiment of FIG. 6, the driving current Id may have the same waveform as the current Is3 of FIG. 3 through the current regulation operation of the driver 300.

Through the structure in which the sensing resistor Rs3 is connected to the ground terminal GND, the sensing voltage provided to the driver 300 in the embodiment of FIG. 6 may be provided at a level that is changed in response to the light emitting states of the LED groups LED1 to LED4, corresponding to the changes of the rectified voltage Vrec, regardless of the operation of the THD reduction circuit 410.

The THD reduction circuit 410 in the embodiment of FIG. 6 changes the driving current Id to follow at least part of the change of the rectified voltage Vrec, the driving current Id being decided by the structure in which the sensing resistor Rs3 is connected to the ground terminal GND.

Therefore, the THD reduction circuit 410 changes the driving current Id to follow at least part of the change of the rectified voltage Vrec, the driving current Id being controlled to have the same waveform as the current Is3 of FIG. 3.

In the embodiment of FIG. 6, the output voltage of the LED group LED1 is also used as the control voltage S1. Therefore, the THD reduction circuit 410 controls the driving current Id to follow the change of the rectified voltage Vrec while the LED group LED1 emits light.

In the embodiment of FIG. 6, a non-linear change of the driving current Id by the change of the current path at the point of time that each of the LED groups emits light or is turned off can be considerably reduced, compared to when the operation of the THD reduction circuit 410 is excluded. Therefore, an occurrence of THD can be reduced as much as the non-linear decrease of the driving current Id is reduced.

As described above, two control steps for the driving current Id may be performed according to the embodiment of the present invention.

More specifically, a control method of an LED lighting apparatus includes controlling one or more LED groups LED1 to LED4 to sequentially emit light in response to changes of a rectified voltage Vrec; providing, by the driver 300, a current path by comparing a sensing voltage to reference voltages corresponding to the one or more LED groups LED1 to LED4 in response to the sequential light emitting states of the one or more LED groups LED1 to LED4; primarily controlling, by the driver 300, the driving current Id on the current path in response to the change of the rectified voltage Vrec while the current path is provided; and secondarily controlling, by the THD reduction circuit 400 or 410, the driving current Id of the driver 300 to follow at least part of the change of the rectified voltage Vrec. The above-described configuration can provide the driving current Id having a waveform to follow at least part of the change of the rectified voltage Vrec through the primary and secondary controls.

The secondary control may be performed using one of the rectified voltage and an output voltage of any one of the LED groups excluding the LED group that finally emits light. Furthermore, the secondary control can control the driving current Id by changing the sensing voltage acting in the driver 300.

The secondary control may be performed through the regulation of the driving current Id outputted from the driver 300.

As described above, the control circuit and method of the LED lighting apparatus according to the embodiments of the present invention can reduce the non-linear change of the driving current Id in response to the turn on/off of the LED groups. Therefore, the THD of the LED lighting apparatus including LEDs can be reduced.

While various embodiments have been described above, it will be understood to those skilled in the art that the embodiments described are by way of example only. Accordingly, the disclosure described herein should not be limited based on the described embodiments.

What is claimed is:

1. A control circuit of an LED lighting apparatus which includes two or more LED groups to sequentially emit light in response to a change of a rectified voltage, the control circuit comprising:
    a driver configured to provide a current path, connected to a first sensing resistor, for a driving current of the two or more LED groups and configured to perform current regulation to regulate a flow of a driving current of the current path by comparing a sensing voltage to two or more reference voltages corresponding to the two or more LED groups; and
    a total harmonic distortion (THD) reduction circuit configured to control the driving current to follow at least part of the change of the rectified voltage according to an output voltage of one of the LED groups excluding the LED group that emits light last in the two or more of the LED groups.

2. The control circuit of claim 1, wherein the THD reduction circuit is installed at both ends or one end of the first sensing resistor connected to the current path.

3. The control circuit of claim 2, wherein the THD reduction circuit comprises a second sensing resistor connected in parallel to the first sensing resistor, and changes the driving current by controlling a current flowing through the second sensing resistor in proportion to the change of the rectified voltage.

4. The control circuit of claim 2, wherein the THD reduction circuit comprises:
    the second sensing resistor connected in parallel to the first sensing resistor; and
    a current control element configured to control a current flowing through the second sensing resistor according to the output voltage of one of the LED groups excluding the LED group that emits light last in the one or more of the LED groups.

5. The control circuit of claim 2, wherein the THD reduction circuit controls a current flowing through the first sensing resistor such that the driving current is proportional to the change of the rectified voltage.

6. The control circuit of claim 5, wherein the THD reduction circuit is connected in series to the first sensing resistor, and controls a current flow between the first sensing resistor and the ground.

7. A control method of an LED lighting apparatus, comprising:
    sequentially emitting light of two or more LED groups in response to a change of a rectified voltage;
    providing, by a driver, a current path, connected to a sensing resistor, by comparing a sensing voltage to two or more reference voltages corresponding to the two or more LED groups in response to a sequential light emitting states of the two or more LED groups;
    primarily controlling, by the driver, to regulate a flow of a driving current on the current path in response to the change of the rectified voltage while the current path is provided; and
    secondarily controlling, by a THD reduction circuit, the driving current outputted from the driver such that the driving current follows at least part of the change of the rectified voltage according to an output voltage of two or more of the LED groups excluding the LED group that emits light last in the two or more of the LED groups,
    wherein the driving current is controlled to have a waveform following at least part of the change of the rectified voltage through the primary and secondary controls.

8. The control circuit of claim 7, wherein the secondary control of the driving current comprises regulating the driving current outputted from the driver.

\* \* \* \* \*